(12) United States Patent
Tebib et al.

(10) Patent No.: US 12,209,788 B2
(45) Date of Patent: Jan. 28, 2025

(54) DEVICE FOR METERING CARBON DIOXIDE SNOW

(71) Applicant: Messer SE & Co. KGaA, Bad Soden (DE)

(72) Inventors: Emir Tebib, Lagny le Sec (FR); Johanna Schirmacher, Willich (DE)

(73) Assignee: Messer SE & Co. KGaA, Bad Soden Am Taunus (DE)

( * ) Notice: Subject to any disclaimer, the term of this patent is extended or adjusted under 35 U.S.C. 154(b) by 289 days.

(21) Appl. No.: 17/635,120

(22) PCT Filed: Jul. 16, 2020

(86) PCT No.: PCT/EP2020/070163
§ 371 (c)(1),
(2) Date: Feb. 14, 2022

(87) PCT Pub. No.: WO2021/032377
PCT Pub. Date: Feb. 25, 2021

(65) Prior Publication Data
US 2022/0243972 A1 Aug. 4, 2022

(30) Foreign Application Priority Data
Aug. 16, 2019 (DE) .......................... 102019005745.7

(51) Int. Cl.
*F25C 5/20* (2018.01)
*C01B 32/55* (2017.01)
*F25D 3/12* (2006.01)

(52) U.S. Cl.
CPC ................ *F25C 5/20* (2018.01); *C01B 32/55* (2017.08); *F25D 3/12* (2013.01)

(58) Field of Classification Search
CPC .............. F25C 5/20; C01B 32/55; F25D 3/12
See application file for complete search history.

(56) References Cited

U.S. PATENT DOCUMENTS

| 4,412,852 A * | 11/1983 | Umino | C01B 32/55 |
| | | | 62/341 |
| 11,378,434 B2 | 7/2022 | Claeys et al. | |
| 2012/0097054 A1* | 4/2012 | Young | B30B 15/32 |
| | | | 100/215 |

FOREIGN PATENT DOCUMENTS

| CN | 108640115 A * | 10/2018 | ............. C01B 32/55 |
| DE | 3200346 A1 | 5/1983 | |

(Continued)

OTHER PUBLICATIONS

English language translation of EP322946 to Frere. (Year: 2017).*

(Continued)

*Primary Examiner* — Cassey D Bauer
(74) *Attorney, Agent, or Firm* — Andrus Intellectual Property Law, LLP

(57) ABSTRACT

In order to meter carbon dioxide snow, a storage container has an output unit, which comprises: an output opening, which is arranged laterally in the bottom region of the storage container; and a horizontally movable sliding element, which cooperates with the output opening. In order to fill the storage container with carbon dioxide snow, at least two snow horns are provided on the storage container, in which snow horns liquid carbon dioxide is converted into a mixture of carbon dioxide snow and carbon dioxide gas. The mouth openings of the snow horns point toward each other at least in one direction component so that the material flows exiting therefrom are directed at least partially toward each other. This facilitates the separation of snow and gas and increase the efficiency of the device.

12 Claims, 1 Drawing Sheet

(56) References Cited

FOREIGN PATENT DOCUMENTS

| DE | 102016003800 A1 | 9/2017 | | |
|----|---|---|---|---|
| DE | 102017008488 A1 | 3/2019 | | |
| EP | 0302285 A1 | 2/1989 | | |
| EP | 1088191 A1 | 4/2001 | | |
| EP | 0942244 B1 | 4/2003 | | |
| EP | 2873937 A1 * | 5/2015 | ............. | F25D 3/125 |
| EP | 3222946 A1 * | 9/2017 | ............. | F25D 3/127 |
| EP | 3246642 A1 | 11/2017 | | |
| FR | 2578036 A1 * | 2/1985 | ............. | C01B 32/55 |
| GB | 2111895 A | 7/1983 | | |
| JP | 2002316810 A * | 10/2002 | ............. | C01B 31/22 |
| WO | 2017016999 A1 | 2/2017 | | |

OTHER PUBLICATIONS

English language Translation of FR2578036 to Hudelot. (Year: 1985).*
English language translation of CN108640115 to Yan et al. (Year: 2018).*
English language translation of JP2002316810 to Takashi (Year: 2002).*
Tebib et al., "Device for Generating and Storing Carbon Dioxide Snow," U.S. Appl. No. 17/907,427, filed Sep. 27, 2022 (specification and drawings only).
International Search Report and Written Opinion in PCT/EP2020/070163, dated Oct. 5, 2020.

* cited by examiner

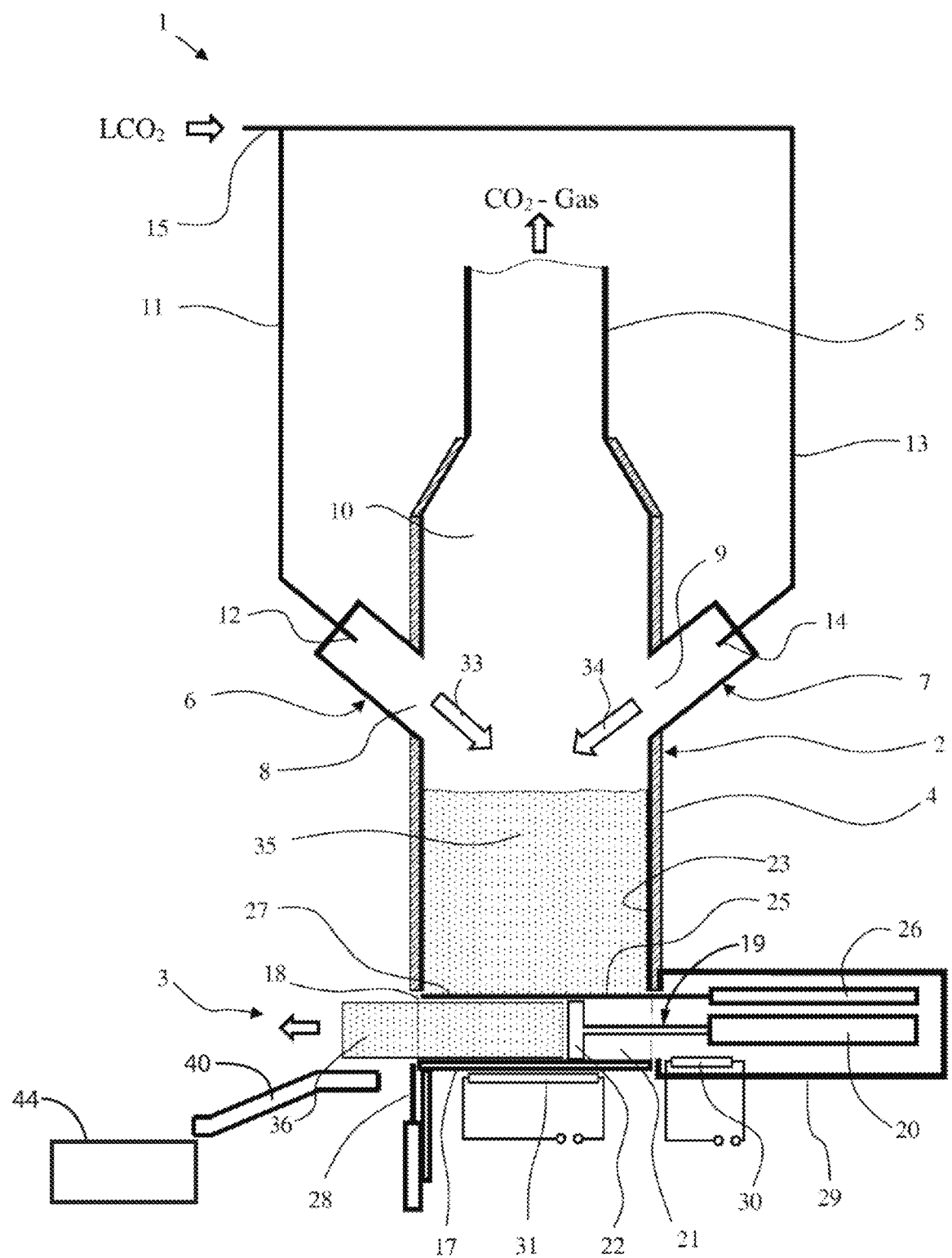

DEVICE FOR METERING CARBON DIOXIDE SNOW

CROSS-REFERENCE TO RELATED APPLICATIONS

This application is the U.S. national stage application of International Application No. PCT/EP2020/070163, filed Jul. 16, 2020, which International Application was published on Feb. 25, 2021, as International Publication WO 2021/032377 A1 in the German language. The International Application claims priority to German Application No. 10 2019 005 745.7, filed Aug. 16, 2019. The International Application and German Application are hereby incorporated herein by reference, in their entireties.

FIELD

The invention relates to an apparatus for metering carbon dioxide snow, having a storage container into which a feed line for carbon dioxide snow and a gas extraction line for removal of carbon dioxide gas open out and which is equipped with a discharge unit for metered delivery of carbon dioxide snow, wherein the discharge unit comprises a discharge opening, which is arranged laterally in the region of a metering section of the storage container, and a horizontally movable sliding element, which interacts with the discharge opening and serves for pushing out carbon dioxide snow situated in the metering section through the discharge opening.

BACKGROUND

For generating carbon dioxide snow, use is made of so-called snow horns. Within the context of the present invention, these are apparatuses in which carbon dioxide snow is generated by expanding liquid carbon dioxide utilizing the Joule-Thomson effect. Here, the snow horn comprises an expansion element in the form of a nozzle, which is normally arranged in the top section of the snow horn above a vertically arranged funnel. Pressurized liquid carbon dioxide is expanded at the expansion nozzle to a pressure of below 5.18 bar, wherein a mixture of carbon dioxide gas and carbon dioxide snow is formed. The carbon dioxide snow drops downward in the funnel under the action of gravitational force, and is applied directly to a product to be cooled or can be collected and fed to a further application. With the use of such snow horns, however, strong turbulent flows, which are generated during the expansion of the liquid carbon dioxide, lead to intensive mixing of gas and snow particles, with the consequence that a considerable portion of the snow particles is entrained by the gas and cannot be easily separated therefrom.

Carbon dioxide snow is used in particular for cooling products which are transported in mobile containers. Here, during the transport, the products to be cooled are stored in a thermally well-insulated cooling compartment which is connected thermally to a refrigerant-receiving compartment which is filled with carbon dioxide snow. Such mobile transport containers are known for example from EP0942244A1 or EP3246642A1. The refrigerant-receiving compartment, for the purpose of being filled with carbon dioxide snow, is connected to a feed device, as is described for example in EP1088191A1 or WO2017016999A1. The feed device injects liquid pressurized carbon dioxide into the refrigerant-receiving compartment, which expands there and changes into a mixture of carbon dioxide gas and carbon dioxide snow. While the carbon dioxide snow is retained in the refrigerant-receiving compartment, the gas which is formed is extracted by suction. Subsequently, the feed device is decoupled from the refrigerant-receiving compartment and is available for filling the next refrigerant-receiving compartment. This process, however, is very time-consuming and labor-intensive and is scarcely suitable for filling a large number of refrigerant-receiving compartments with carbon dioxide snow in a short time.

EP3222946A1 has disclosed an apparatus for metering carbon dioxide snow. The apparatus has a storage container which is filled with carbon dioxide snow by means of a snow horn installed on the storage container. The carbon dioxide gas generated during the generation of the carbon dioxide snow is removed via an exhaust-gas line. A discharge unit is arranged on the storage container and comprises a discharge opening, which is arranged laterally in the base region of the storage container, and a horizontally movable sliding element, which interacts with the discharge opening. The sliding element can be moved between a first position, in which the discharge opening and a metering section of the storage container are closed off, and a second position, in which the metering section and the discharge opening are opened up. It is possible through actuation of the sliding element for an exactly defined volume of carbon dioxide snow to be expelled via the discharge opening.

The apparatus known from EP3222946A1 has proven to be effective, but is still in need of improvement to the extent that, with the generation of the carbon dioxide snow through expansion of liquid carbon dioxide, a not inconsiderable portion of the snow is entrained by the stream of the carbon dioxide gas removed. This portion is therefore no longer available for the cooling task, and moreover, in particular in the case of relatively long operating durations, the functionality in relation to the gas extraction can be impaired as a result of carbon dioxide snow becoming caked on or moisture freezing solid.

SUMMARY

It is therefore an object of the invention to create a low-maintenance apparatus which generates carbon dioxide snow by expansion of liquid carbon dioxide and which is capable of producing and providing accurately metered quantities of carbon dioxide snow at short time intervals with low quantity losses.

Said object is achieved by an apparatus having the features recited in the independent claim(s). Advantageous configurations are specified in the dependent claims.

An apparatus of the type and purpose mentioned in the introduction is thus characterized in that provision is made of at least two snow horns which in each case are connected to a feed line for liquid carbon dioxide and open out into the storage container at a mouth opening and which are arranged in such a way that the streams of carbon dioxide snow and carbon dioxide gas entering the storage container from their mouth openings are directed toward one another at least in terms of a directional component, and the gas extraction line leads away from the storage container above the mouth openings of the snow horns.

The snow horns each comprise an expansion volume into which, for generating a stream of carbon dioxide gas and carbon dioxide snow, the feed line for liquid carbon dioxide opens out at an expansion nozzle. For their part, the snow horns open out, preferably at the same height, into the vertically arranged, for example tubular or cylindrical, storage container at in each case one mouth opening.

At the expansion nozzles in the snow horns, as a result of expansion of fed pressurized liquid carbon dioxide, a mixture of carbon dioxide snow and carbon dioxide gas is generated, which mixture then flows into the interior of the storage container from the snow horns. The streams of mixture of carbon dioxide snow and carbon dioxide gas that exit from the mouth openings of the snow horns collide with one another in the interior of the storage container and, in terms of their momenta, at least partially cancel one another out. In this way, turbulence is reduced and snow particles are separated from the gas stream. The carbon dioxide snow drops in the interior of the storage container, while the gas is removed upwardly through the gas extraction line. The gas extraction line therefore departs from the storage container above the mouth openings of the snow horns; for example, the mouth of the gas extraction line is situated 20-100 cm above the mouth openings of the snow horns, that section of the storage container situated therebetween serving here as a separating section in which snow particles entrained by the gas stream are separated from the gas.

The snow horns may be arranged on the storage container in such a way that they point toward one another frontally with their mouth openings or, what is preferable within the context of the present invention, at an acute angle, with the mouth openings toward the bottom. Preferably, the storage container has a rectangular or square cross section, and an in each case equal number of snow horns (in each case one snow horn in the simplest case) are/is arranged in mutually opposite, vertically extending side walls of the storage container at in each case the same height. Here, a separating section of the aforementioned type provided between the mouth openings of the snow horns and the mouth of the gas extraction line preferably has the same cross section as the storage container below the mouth openings.

The storage container, which is closed at its bottom side by a base, has in its lower region a discharge unit, which has a laterally arranged discharge opening, and a metering section, which is adjacent to said discharge unit. The metering section is a base-side sub-volume of the storage container, which is arranged below the mouth openings of the snow horns and whose size defines the quantity of the carbon dioxide snow expelled in each case during a work cycle of the apparatus. Beside the discharge opening, the discharge unit comprises a horizontally movable sliding element which interacts with the discharge opening and which can be moved between a first position, in which the discharge opening and the metering section of the storage container are closed off, and a second position, in which the metering section and the discharge opening are opened up.

The sliding element is for example a plastic or metal body which can be pushed or pivoted into the metering section of the storage container and which has an areal section corresponding to the size and shape of the discharge opening and acting as a sliding plate, by means of which, after the metering section has been filled with carbon dioxide snow, the latter can be pushed out of the storage container through the discharge opening.

The discharge unit furthermore has means which separate the carbon dioxide snow present in the metering section from the carbon dioxide snow situated in the storage container above the metering section. Said means preferably comprise a plastic or metal separating cutter which is arranged above the sliding element but below the mouth openings of the snow horns. The separating cutter is moved with preference independently of the sliding element in a horizontal direction and, for this purpose, is expediently received in lateral guide rails which are arranged horizontally in the interior of the storage container. The snow body situated in the storage container is divided just above the sliding element in a substantially horizontal plane by the separating cutter when the latter is used. At the same time, the separating cutter, which is in the form of an areal component, prevents carbon dioxide snow from dropping down from those sections of the storage container which are situated thereabove into the metering section. In this way, the separating cutter not only facilitates the subsequent actuation of the sliding element for expelling the carbon dioxide snow situated in the metering section, but also ensures that an exactly defined quantity of carbon dioxide snow is expelled in the process.

Through displacement or pivoting of the separating cutter and the sliding element into an open position which is lateral with respect to the interior space of the storage container, the metering section is opened up and carbon dioxide snow which had been situated within the storage container above the separating cutter drops into the metering section. By way of a renewed actuation of separating cutter and sliding element, this time back into the respective closed position from the open position, the carbon dioxide snow situated within the metering section is separated from the rest of the carbon dioxide snow and, by means of the sliding element, is pushed out of the storage container through the discharge opening and fed to the further application thereof.

Owing to attracting forces between the snow particles, the carbon dioxide snow expelled from the discharge opening forms a snow body which has considerable dimensional stability and which can, at least over a short distance, be transported as a whole by means of suitable conveying means, for example a chute, a feed channel and/or a conveyor belt. Mechanical compression of the carbon dioxide snow by means of pistons to form a dry ice block, as described for example in GB2111895A1, is not necessary for this purpose and does not take place in the apparatus according to the invention; the generation of compressed dry ice blocks is not the subject of the present invention.

In a further configuration of the invention, the discharge opening can be closed off by a movable cover. The cover is preferably opened at the same time as the actuation of the sliding element and/or by way of the movement of the carbon dioxide snow pushed forward by the sliding element, although it is also conceivable for cover and sliding element to be actuable independently of one another.

The sliding element and/or the separating cutter are/is preferably equipped with in each case one, for example electric or hydraulic or pneumatic, drive unit, the drive units preferably being actuable independently of one another and bringing about the automatic movement of the respective element. In a further configuration of the invention, said drive units may also interact with a control unit which coordinates the automatic actuation of the respective element. For example, the control unit determines, by means of suitable sensors, the movement of products to be cooled, or of refrigerant-receiving compartments to be filled, on a conveyor belt which is guided past the discharge unit, and causes the automatic delivery of carbon dioxide snow if and only if a product or a refrigerant-receiving compartment is situated at the discharge opening. In a further configuration, the control unit may also interact with sensors which detect the height of the carbon dioxide snow in the storage container and, upon attainment of a predefined filling height of the carbon dioxide snow in the storage container, temporarily prevent the further feeding of liquid carbon dioxide.

In order to prevent an impairment of the functionality of the apparatus according to the invention by caked-on carbon dioxide snow or by moisture which penetrates and freezes to form water ice, a preferred configuration of the apparatus according to the invention provides that the base and/or the walls of the storage container and/or the sliding element and/or the separating cutter are equipped with heating devices. For the separating cutter and the sliding element, which are horizontally movable and can be displaced from the storage container into an outside operating position which is lateral with respect to the storage container, the heating device is preferably arranged outside the storage container and heats the respective component in its outside operating position. For example, for this purpose, the element is moved into a heatable receiving device which is situated next to the storage container.

Preferably, the apparatus according to the invention is used in an arrangement for filling refrigerant-receiving compartments of cooling containers with carbon dioxide snow. The arrangement has a transport device for transporting refrigerant-receiving compartments or cooling containers equipped with refrigerant-receiving compartments, has at least one apparatus according to the invention, and has conveying means by means of which carbon dioxide snow expelled from the apparatus is fed to a refrigerant-receiving compartment. For example, said conveying means are a flat sheet or a chute via which the carbon dioxide snow, which, as stated above, has the form of a stable snow block, slides into the refrigerant-receiving compartment. Alternatively or additionally, a conveyor belt may also be used for this purpose. By means of the transport device, the refrigerant-receiving compartments are, in succession, guided past the discharge unit of the apparatus according to the invention and filled with carbon dioxide snow, wherein a control unit provides for time- and quantity-accurate metering of the carbon dioxide snow.

In order to increase the efficiency of said arrangement, at the transport device, two or more apparatuses according to the invention are preferably arranged one behind the other as seen in the transport direction, which apparatuses are connected to a common feed line for liquid carbon dioxide and to a common gas extraction line. In this way, predefined carbon dioxide quantities can be metered at the same time or with a temporal offset in that the actuation of the respective discharge unit is regulated by means of a control unit according to a predefined program or in a manner dependent on measured parameters.

The invention allows accurate metering of a quantity of carbon dioxide snow to be delivered. At the same time, during the operation of the apparatus, icing of the gas extraction line is avoided and the loss of carbon dioxide snow via the extracted gas stream is minimized. An apparatus according to the invention is suitable in particular for delivery of doses of 5 g to 1500 g of carbon dioxide snow, preferably of between 10 g and 1000 g (a corresponding multiple thereof in the case of the aforementioned combination of two or more apparatuses according to the invention arranged at the transport device), which, at short time intervals of for example less than 1 s, are to be applied to objects to be treated or are to be introduced into refrigerant-receiving compartments of mobile cooling containers.

BRIEF DESCRIPTION OF THE DRAWING

An exemplary embodiment of the invention will be discussed in more detail on the basis of the drawing. The single drawing schematically shows an apparatus according to the invention in a vertical sectional view.

DETAILED DESCRIPTION

The apparatus 1 shown in the FIGURE comprises a storage container 2 for storing carbon dioxide snow, and a discharge unit 3 for carbon dioxide snow, which discharge unit is arranged in a lower section of the storage container 2.

The storage container 2, which is constructed substantially cylindrically and so as to have a rectangular or square cross section, is equipped with thermal insulation 4 on the lateral surface. A gas extraction line 5 for removal of carbon dioxide gas opens out at the upper face side of the storage container 2, said upper face side being opposite the discharge unit 3.

For generating carbon dioxide snow, snow horns 6, 7 are arranged on two opposite longitudinal sides of the storage container 2. The snow horns 6, 7 are positioned at an angle to the storage container 2 and open out, in each case by way of a mouth opening 8, 9, into the interior of the storage container 2, wherein the mouth openings 8, 9 are arranged at the same height and approximately 20-100 cm below the gas extraction line 5 and, in this way, form between gas extraction line 5 and mouth openings 8, 9 a separating section 10 in the storage container 2, the cross section of which separating section corresponds to the cross section of the storage container 2 below the mouth openings 8, 9. A carbon-dioxide feed line 11 opens out, at an expansion nozzle 12, into the snow horn 6 at that face side of the latter which is opposite the mouth opening 8. In the same way, a carbon-dioxide feed line 13 opens out, at an expansion nozzle 14 into the snow horn 7, into the snow horn 7. The carbon-dioxide feed lines 11, 13 are connected to a common carbon-dioxide line 15, which is connected to a source (not shown here) for pressure-liquefied carbon dioxide, for example to a standing tank.

The discharge unit 3 comprises a discharge opening 18, which is arranged laterally above a base 17 of the storage container 2, and a horizontally movable sliding element 19, which interacts with said discharge opening and can be actuated by means of a drive unit 20. In the position shown in the FIGURE, the sliding element 19 projects into a lower region (referred to here as metering section 21) of the interior space of the storage container 2; said sliding element can however, by means of the drive unit 20, firstly be pushed forward as far as the discharge opening 18, and secondly be moved back as far as a position in which its front surface 22 is aligned with the inner wall 23 of the corresponding side wall of the storage container 2 and consequently at the same time terminates said side wall in a manner substantially impermeable to snow and gas.

A separating cutter 25, which is preferably accommodated in a horizontally movable manner in lateral guide rails (not shown here), is arranged directly above the sliding element 19. The separating cutter 25 can, by means of a separate drive unit 26, firstly be pushed forward to such an extent that its cutting edge 27 is situated in the region of the discharge opening 18, and secondly be pulled back (to the right in the diagram) to such an extent that the entire separating cutter 25, including the cutting edge 27, is situated laterally outside the storage container 2.

The discharge opening 18 can be closed and opened by a motor-driven flap or, as shown here, by a motor-driven sliding element 28 which is moved vertically, for example from below, in front of the discharge opening 18. The drive units 20, 26 are arranged in a common enclosure 29 in which an electric heating device 30 is also provided. It is also possible for the base 17 of the storage container 2 to be heated by means of a heating device 31.

During the operation of the apparatus 1, the sliding element 19 and the separating cutter 25 are initially in a state arranged pulled back in the direction of the enclosure 29. The metering section 21 is thus upwardly open and connected to the rest of the interior space of the storage container 2. At the same time, the sliding element 28 is in its closed state, in which it obstructs the discharge opening 18. Liquid carbon dioxide is directed to the nozzles 12, 14 via the feed lines 15, 11 and 13. The pressurized liquid carbon dioxide expands at the nozzles 12, 13 and changes into a mixture of carbon dioxide snow and carbon dioxide gas, which mixture flows into the interior of the storage container 2 from the mouth openings of the snow horns 6, 7. Since the horizontal directional components of the two streams 33, 34 (indicated here by arrows) point toward one another, the carbon dioxide particles contained in the streams 33, 34 collide with one another, are substantially removed from the stream of the carbon dioxide gas and drop toward the bottom in the storage container 2. There, said carbon dioxide particles form a snow supply 35. The sliding element 28 prevents snow from penetrating to the outside via the discharge opening 18.

The carbon dioxide gas largely separated from the carbon dioxide particles flows upward in the storage container 2 and is extracted via the gas extraction line 5. During the passage through the separating section 10, snow particles still contained in the gas stream are in the process separated therefrom and drop into the snow supply 35.

The carbon dioxide snow 26 situated within the metering section 21 is separated from the snow supply 35 by virtue of the separating cutter 24 being pushed forward. The carbon dioxide snow 36 is then pushed out from the discharge opening 18 by virtue of the front surface 22 of the horizontally movable sliding element 19 being pushed forward with the sliding element 28 being opened at the same time. Here, the carbon dioxide snow 36 is not compressed; however, owing to attracting forces acting between the particles of the carbon dioxide snow 36, the carbon dioxide snow 36 has considerable dimensional stability, which results in the carbon dioxide snow 36 having the form of a snow body which is adapted to the shape of the metering section 21 and, as such, being able to be transported and being able to be fed to a further application. For example, the carbon dioxide snow is fed to the refrigerant-receiving compartment 44 of a cooling container via a conveying means 40.

The electric heating devices 30, 31 prevent water ice, which can impair the functionality of the apparatus 1, from forming as a result of penetrating moisture. Here, the heating device 31 heats the base 17 of the storage container 2 according to requirement, while the enclosure 29 can be heated by means of the heating device 30, whereby both the drive units 20, 26 and the sliding element 19 and the separating cutter 25 are protected against icing. Furthermore, the storage container 2 is also heated below and/or above the snow horns 6, 7 (not shown here) in order to avoid adherences of $CO_2$ snow. It goes without saying that, by means of the heating devices 30, 31, it is also possible for undesirable accumulations of carbon dioxide snow that are situated in the enclosure 29 and/or can become caked on the base 17 to be removed.

By means of the apparatus 1, it is possible to generate a defined quantity of carbon dioxide snow, and to deliver this via the discharge unit 3, in a rapid sequence. In this way, a relatively large number of refrigerant-receiving compartments 44 of cooling containers can be loaded with carbon dioxide snow very rapidly in succession, which refrigerant-receiving compartments 44, for this purpose, are guided past the apparatus 1 by means of a transport device. Carbon dioxide snow that is expelled from the discharge unit 3 is fed to the refrigerant-receiving compartments 44 by a conveying means 40 (e.g., a conveyor belt, or a sheet or chute via which the carbon dioxide snow slides into the refrigerant-receiving compartment 44). The frequency of the filling of such refrigerant-receiving compartments 44 can be increased further through the provision along the transport device of two or more apparatuses 1 which are actuated in succession or in alternation.

The invention makes possible metering of a carbon dioxide quantity that is accurate in comparison with corresponding apparatuses from the prior art and has low susceptibility to faults owing to caked deposits of carbon dioxide snow or as a result of formation of water ice.

LIST OF REFERENCE SIGNS

1. Apparatus
2. Storage container
3. Discharge unit
4. Insulation
5. Gas extraction line
6. Snow horn
7. Snow horn
8. Mouth opening (of the snow horn 6)
9. Mouth opening (of the snow horn 7)
10. Separating section
11. Carbon-dioxide feed line
12. Expansion nozzle
13. Carbon-dioxide feed line
14. Expansion nozzle
15. Carbon-dioxide line
16. 
17. Base
18. Discharge opening
19. Sliding element
20. Drive unit
21. Metering section
22. Front surface
23. Inner wall
24. -
25. Separating cutter
26. Drive unit
27. Cutting edge
28. Sliding element
29. Enclosure
30. Heating device
31. Heating device
32. -
33. Stream
34. Stream
35. Snow supply
36. Carbon dioxide snow
40. Conveying means
44. Refrigerant-receiving compartment

The invention claimed is:
1. An apparatus for metering carbon dioxide snow, comprising:
  a storage container connected to a feed line for carbon dioxide snow and a gas extraction line for removal of carbon dioxide gas;

a discharge unit for metered delivery of carbon dioxide snow, wherein the discharge unit comprises a discharge opening, which is arranged laterally in the region of a metering section of the storage container, and a horizontally movable sliding element, which interacts with the discharge opening and serves for pushing out carbon dioxide snow situated in the metering section through the discharge opening;

at least two snow horns which in each case are connected to said feed line for liquid carbon dioxide and open out into the storage container at a mouth opening and which are arranged in such a way that the streams of carbon dioxide snow and carbon dioxide gas entering the storage container from their mouth openings are directed toward one another at least in terms of a directional component, and the gas extraction line leads away from the storage container above the mouth openings of the snow horns;

a plurality of heating devices including a first heating device configured to heat the storage container and a second heating device configured to heat the sliding element; and an enclosure located adjacent to the metering section, wherein the sliding element is located at least partially inside the enclosure;

wherein the second heating device is positioned in the enclosure and configured to heat an interior of the enclosure, thereby heating the sliding element in the enclosure.

2. The apparatus as claimed in claim 1, wherein the snow horns are arranged on the storage container at an acute angle, with the mouth openings toward the bottom.

3. The apparatus as claimed in claim 1, wherein, above the sliding element, provision is made of a separating cutter which can be moved horizontally into the interior of the storage container and which serves for partitioning of a sub-volume of a snow quantity which is situated in the storage container.

4. The apparatus as claimed in claim 1, wherein the storage container has a rectangular or square cross section, and an in each case equal number of snow horns are arranged in mutually opposite, vertically extending side walls of the storage container.

5. The apparatus as claimed in claim 3, wherein the first heating device is positioned in a base and/or side walls of the storage container.

6. An arrangement for filling refrigerant-receiving compartments of mobile cooling containers with carbon dioxide snow, the arrangement comprising
an apparatus as claimed in claim 1, and
conveying means for transporting into the refrigerant-receiving compartments carbon dioxide snow expelled from the discharge unit of the apparatus as the refrigerant-receiving compartments are, in succession, guided past the discharge unit of the apparatus.

7. An arrangement for filling a plurality of refrigerant-receiving compartments of mobile cooling containers with carbon dioxide snow as the plurality of refrigerant-receiving compartments are transported, in succession, in a transport direction, the arrangement comprising:
a plurality of apparatuses as claimed in claim 1 arranged one after another along the transport direction of the transported refrigerant-receiving compartments;
a common feed line for liquid carbon dioxide connected to the plurality of apparatuses; and
a common gas extraction line connected to the plurality of apparatuses.

8. The apparatus as claimed in claim 3, wherein the separating cutter is located at least partially inside the enclosure.

9. The apparatus as claimed in claim 3, wherein the sliding element and the separating cutter are each equipped with a heating device from the plurality of heating devices.

10. The apparatus as claimed in claim 8, wherein the first heating device is configured to heat a base of the storage container and the second heating device is configured to heat the sliding element and the separating cutter.

11. The apparatus as claimed claim 1, wherein the sliding element is configured to slide out from the enclosure and into the metering section to push the carbon dioxide snow out of the metering section via the discharge opening.

12. The apparatus as claimed in claim 11, wherein the sliding element comprises a front surface configured to push the carbon dioxide snow out of the metering section and a drive unit that is positioned in the enclosure and configured to extend and retract the front surface relative to the metering section.

* * * * *

UNITED STATES PATENT AND TRADEMARK OFFICE
CERTIFICATE OF CORRECTION

PATENT NO. : 12,209,788 B2  
APPLICATION NO. : 17/635120  
DATED : January 28, 2025  
INVENTOR(S) : Emir Tebib et al.

Page 1 of 1

It is certified that error appears in the above-identified patent and that said Letters Patent is hereby corrected as shown below:

In the Claims

Claim 11, Column 10, Line 34, between "claimed" and "claim" insert -- in --.

Signed and Sealed this
First Day of April, 2025

Coke Morgan Stewart
*Acting Director of the United States Patent and Trademark Office*